US011873024B2

(12) United States Patent
Okamoto et al.

(10) Patent No.: US 11,873,024 B2
(45) Date of Patent: Jan. 16, 2024

(54) SUSPENSION SUBFRAME STRUCTURE (71) Applicant: MAZDA MOTOR CORPORATION, Hiroshima (JP)

(72) Inventors: Hiroyuki Okamoto, Hiroshima (JP); Masaaki Tanaka, Hiroshima (JP); Fumihiro Kurohara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 254 days.

(21) Appl. No.: 17/276,300

(22) PCT Filed: Sep. 13, 2019

(86) PCT No.: PCT/JP2019/036164
§ 371 (c)(1),
(2) Date: Mar. 15, 2021

(87) PCT Pub. No.: WO2020/059669
PCT Pub. Date: Mar. 26, 2020

(65) Prior Publication Data
US 2021/0261195 A1    Aug. 26, 2021

(30) Foreign Application Priority Data

Sep. 19, 2018   (JP) .................. 2018-175213

(51) Int. Cl.
*B62D 21/15*   (2006.01)
*B62D 21/11*   (2006.01)
*B60R 19/24*   (2006.01)

(52) U.S. Cl.
CPC ............ *B62D 21/155* (2013.01); *B62D 21/11* (2013.01); *B60R 19/24* (2013.01)

(58) Field of Classification Search
CPC ........ B62D 21/155; B62D 21/11; B60R 19/24
(Continued)

(56) References Cited

U.S. PATENT DOCUMENTS 8,746,718 B2 *   6/2014   Otani ................... B60G 7/02
                                         280/124.109
2011/0198832 A1   8/2011   Takeshita et al.
(Continued)

FOREIGN PATENT DOCUMENTS

JP   2011-162158 A   8/2011
JP   2013-203242 A   10/2013
(Continued)

OTHER PUBLICATIONS

International Preliminary Report on Patentability and Written Opinion issued in PCT/JP2019/036164; dated Mar. 23, 2021.
(Continued)

*Primary Examiner* — Amy R Weisberg
*Assistant Examiner* — Dana D Ivey
(74) *Attorney, Agent, or Firm* — Studebaker & Brackett PC (57) ABSTRACT Provided is a suspension subframe structure that can activate a load path using an extension frame in an impact while avoiding increase in vehicle weight and also enables a suspension subframe to disengage from a vehicle body when an impact load is too large to be absorbed by the extension frame alone. The suspension subframe structure of the present invention includes a suspension subframe 110 that supports a suspension member 60 for a front wheel. The suspension subframe 110 includes: a body 111 that transmits an impact load input from a vehicle front side toward a vehicle rear side; a fixed portion 124 disposed near the body 111 and fixed to a vehicle body; and a connection portion 121 connecting the fixed portion 124 to the body 111. The connection portion 121 is provided with fragile portions 121f, 122g having a lower strength against a load in a vehicle front-rear direction than the body 111 and the fixed portion 124.

20 Claims, 8 Drawing Sheets (58) Field of Classification Search
USPC .................................................. 296/187.09
See application file for complete search history.

(56) References Cited

U.S. PATENT DOCUMENTS

| | | |
|---|---|---|
| 2015/0083514 A1 | 3/2015 | Asano et al. |
| 2017/0073009 A1 | 3/2017 | Sangha et al. |
| 2017/0120953 A1* | 5/2017 | Tomikuda .............. B62D 21/11 |

FOREIGN PATENT DOCUMENTS

| | | | |
|---|---|---|---|
| JP | 2015-058856 A | | 3/2015 |
| JP | 2017-218112 A | | 12/2017 |
| JP | 2017218112 A | * | 12/2017 |

OTHER PUBLICATIONS

International Search Report issued in PCT/JP2019/036164; dated Oct. 15, 2019.

* cited by examiner

SUSPENSION SUBFRAME STRUCTURE

TECHNICAL FIELD

The present invention relates to a suspension subframe structure and to a vehicle-body structure of a vehicle, such as an automobile.

BACKGROUND ART

A known vehicle-body front structure includes a pair of right and left front side frames extending in a front-rear direction of a vehicle and constituting a front portion of a vehicle body and includes a suspension subframe (hereinafter, also simply referred to as a "subframe") disposed below the front side frames for supporting right and left suspension links for front wheels.

A subframe of a vehicle-body front structure disclosed in Patent Literature 1 is formed of a U-shape opening rearward in plan view that is comprised of right and left side portions disposed below front side frames and a front side portion connecting front ends of the right and left side portions in a vehicle width direction. The subframe is fixed to the front side frames at respective rear ends of the right and left side portions. The subframe is mounted with tower members that stand upright from respective front ends of the right and left side portions and are connected to respective bottom faces of the front side frames. The tower members are mounted with a pair of extension frames that extend frontward from an intermediate position, in an up-down direction, of the tower members.

In the structure disclosed in Patent Literature 1, an impact load from the vehicle front side is distributed over a main load path where the load is directly input to the front side frames and a load path where the load is input to the front side frames via the extension frames and the tower members. As such, the structure can distribute the impact load by providing the load path that goes through the extension frames.

The above extension frame can function as a shock absorbing member that absorbs an impact load from the vehicle front side by deforming under the load. The tower member functions as a load receiving portion that receives the impact load input via the extension frame in order to ensure the impact load absorption by the extension frame.

In the vehicle-body front structure disclosed in Patent Literature 1, the extension frame is connected to an intermediate portion of the tower member. Therefore, it is necessary to make the tower member rigid in order to restrain its bending deformation under an impact load input from the vehicle front side and thus ensure sufficient shock absorbing function of the extension frame. However, making the tower member rigid often leads to increase in the vehicle weight, so that there is room for improvement in decreasing the vehicle weight.

Thus, it may be possible that the tower members are removed and instead a load path is created that runs from the extension frames through the right and left side portions of the subframe to the front side frames via the respective rear ends of the right and left side portions of the subframe. In this case, rear ends of the extension frames may be directly connected to respective front ends of the right and left side portions of the subframe that have a high rigidity in the front-rear direction. This enables the subframe to function as a load receiving portion that receives the impact load input to the extension frames from the vehicle front side, thus facilitating shock absorption by the extension frames.

Meanwhile, using the subframe, which has a high rigidity against a load in the front-rear direction, as the load path as described above may cause deformation of a vehicle cabin due to the impact load that has not been fully absorbed by the extension frames being transmitted to the vehicle cabin via the subframe. Also, deformation of the front side frames may be inhibited in the region in the vehicle front-rear direction where the high-rigidity subframe is located, which may in turn inhibit the shock absorbing function of the front side frames and thus result in deformation of the vehicle cabin.

To solve these problems, a mounting structure may be adopted that can facilitate disengagement of the subframe from the vehicle body in response to input of a large load that cannot be fully absorbed by deformation of the extension frames. For example, for vehicles mounted with a transversely mounted powertrain that rolls so as to fall rearward in response to input of an impact load from the vehicle front side, a mounting structure may be adopted that allows the subframe to disengage downward from its mounted position on the vehicle body by utilizing the rolling motion of the powertrain.

CITATION LIST

Patent Literature

Patent Literature 1: Japanese Patent Laid-Open No. 2015-058856

SUMMARY OF INVENTION

Technical Problem

However, besides the above rolling motion, the powertrain can make various motions in response to input of an impact load from the vehicle front side depending on how the powertrain is installed, such as sliding motion toward the vehicle rear side. Hence, depending on how the powertrain is installed, the above-described mounting structure utilizing the rolling motion of the powertrain may not be adopted, and in such cases a new measure is required to facilitate the disengagement of the subframe from the vehicle body.

Hence, an object of the present invention is to provide an entirely new suspension subframe structure that can effectively restrain deformation of the vehicle cabin while creating a load path that goes through the suspension subframe, in the event of an impact load being input from the vehicle front side.

Solution to Problem

The present invention to achieve the above object is a suspension subframe structure including: a suspension subframe that supports a suspension member for a front wheel, characterized in that the suspension subframe includes: a body that transmits an impact load input from a vehicle front side toward a vehicle rear side; a fixed portion disposed near the body and fixed to a vehicle body; and a connection portion connecting the fixed portion to the body, and the connection portion is provided with a fragile portion having a lower strength against a load in a vehicle front-rear direction than the body and the fixed portion.

According to this invention, when an impact load is input to the suspension subframe from the vehicle front side, breakage is facilitated at the fragile portion between the body and the fixed portion. This facilitates displacement of the body relative to the fixed portion, which in turn facilitates substantial disengagement of the suspension subframe from the vehicle body. This restrains a large impact load from the vehicle front side from being transmitted to the vehicle cabin via the suspension subframe and also restrains the suspension subframe from inhibiting deformation of the vehicle body, such as the front side frame, in the region in the vehicle front-rear direction where the suspension subframe is located. Hence, the present invention can effectively restrain deformation of the vehicle cabin by breaking the load path going through the suspension subframe when an input load is relatively large, while distributing the input load by using that load path when the load is relatively small.

The above breakage in the fragile portion can occur under an input load in the vehicle front-rear direction. This means that the above disengagement of the suspension subframe from the vehicle body does not require an input load in the up-down direction from the powertrain. Hence, the present invention can effectively restrain deformation of the vehicle cabin as described above, regardless of how the powertrain is installed.

In the present invention, preferably, an extension frame extending from a front end of the body toward the vehicle front side is connected with the suspension subframe.

According to this invention, when an impact load is input to the extension frame from the vehicle front side, the body of the suspension subframe connected to the rear end of the extension frame functions as a load receiving portion, which ensures effective shock absorption by deformation of the extension frame.

If the suspension subframe remains fixed to the vehicle body in the event of input of a load greater than or equal to a load that can be absorbed by the extension frame (hereinafter also referred to as an "impact load greater than or equal to a predetermined load"), a residual impact load would be transmitted to the vehicle cabin via the body of the suspension subframe.

According to the present invention, on the contrary, the suspension subframe is broken at the fragile portion and thus substantially disengages from the vehicle body, which can effectively restrain the impact load that fails to be absorbed by the extension frame from being transmitted to the vehicle cabin.

In the present invention, preferably, the fixed portion is disposed laterally to the body.

According to this invention, the fixed portion is disposed beside the body, which realizes a compact structure of the suspension subframe in the up-down direction. Hence, the present invention can effectively restrain deformation of the vehicle cabin as described above while improving layout flexibility in the up-down direction.

In the present embodiment, preferably, the body has a closed cross-section continuous in the vehicle front-rear direction, the fixed portion is a sleeve member into which a bolt for fastening to the vehicle body is inserted, and the connection portion is a plate member joined to an end face of the sleeve member with the bolt.

According to the present invention, the connection portion is composed of a plate member that has a lower strength than the body, which has a closed cross-section continuous in the vehicle front-rear direction, and the fixed portion, which is composed of a sleeve member, and thus the present invention can effectively facilitate breakage of the connection portion. Hence, as described above, the present invention can effectively restrain deformation of the vehicle cabin as the invention allows for breakage of the load path going through the suspension subframe when an input load is relatively large, while distributing the input load by using that load path when the load is relatively small.

In the present embodiment, preferably, a reinforcement member is mounted at a portion of the connection portion located between the fixed portion and the body, and the fragile portion is provided at a portion of the connection portion located closer to the fixed portion relative to the reinforcement member.

According to the present invention, the connection portion is mounted with the reinforcement member. This facilitates, in response to input of an impact load from the vehicle front side, breakage of the fragile portion at a portion of the connection portion located closer to the fixed portion relative to the reinforcement member, while assuring favorable mounting strength for the suspension subframe in normal conditions.

Additionally, since the reinforcement member is disposed between the body and the fixed portion, interference between the fixed portion and the reinforcement member can be readily avoided when the body is displaced toward the vehicle rear side relative to the fixed portion in response to input of an impact load from the vehicle front side. Hence, the present invention can realize effective breakage of the fragile portion that utilizes the displacement of the body relative to the fixed portion.

In the present embodiment, preferably, the fragile portion is provided with a breakage facilitating portion that facilitates breakage to allow the fixed portion to be displaced toward the vehicle front side relative to the body when a load is input to the body from the vehicle front side.

According to this invention, when an impact load is input to the body of the suspension subframe from the vehicle front side, the breakage facilitating portion provided to the fragile portion facilitates breakage to allow the fixed portion to be displaced toward the vehicle front side relative to the body, thus enabling the suspension subframe to disengage from the vehicle body so as to slide toward the vehicle rear side.

Advantageous Effect of Invention

The suspension subframe structure of the present embodiment can effectively restrain deformation of the vehicle cabin while creating a load path that goes through the suspension subframe, in the event of an impact load being input from the vehicle front side.

DESCRIPTION OF EMBODIMENT

A detailed description will now be given of a suspension subframe structure according to an embodiment of the present invention.

Figure 1:
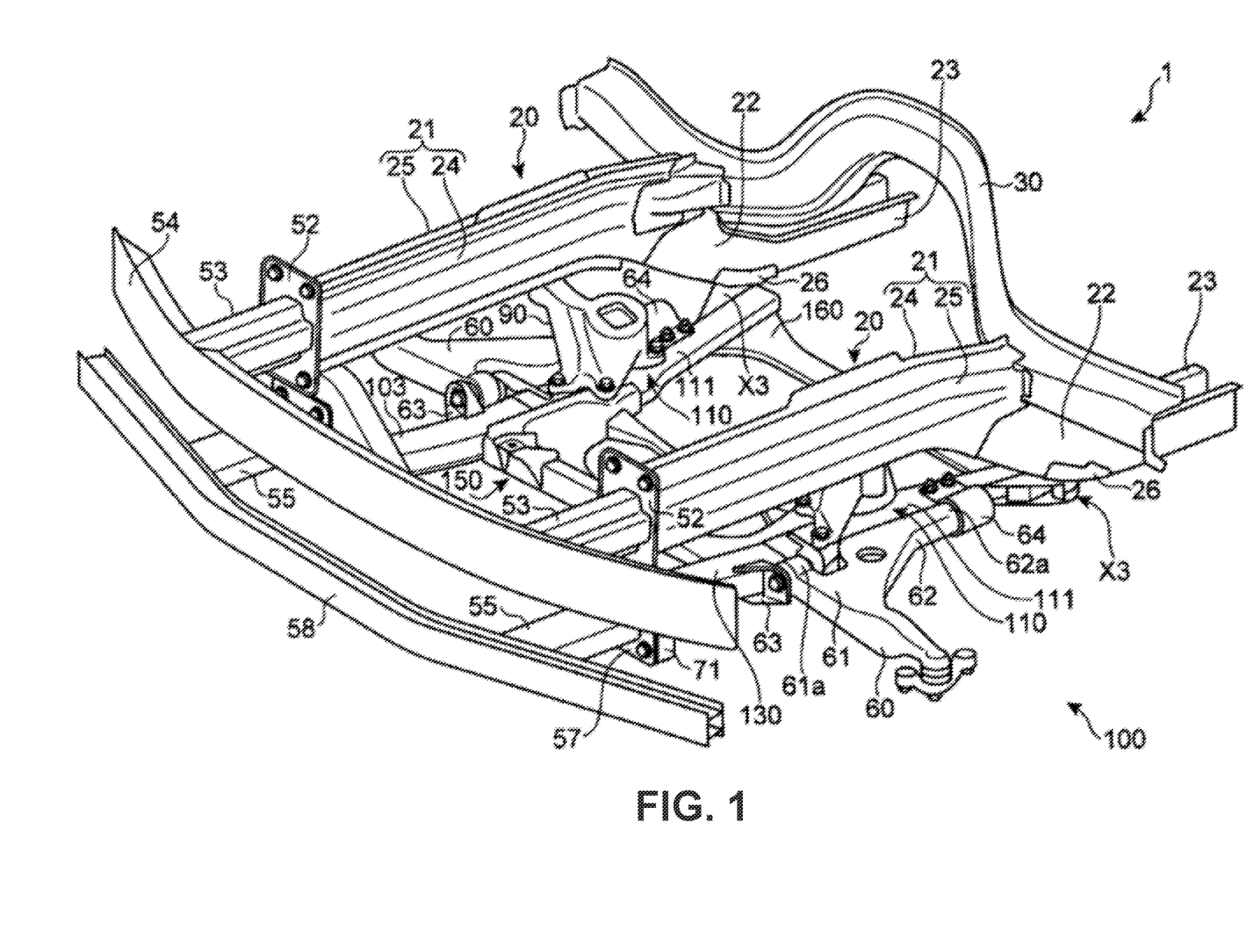
FIG. 1 is a perspective view of a front portion of a vehicle body including a suspension subframe structure according to an embodiment of the present invention.
Figure 2:
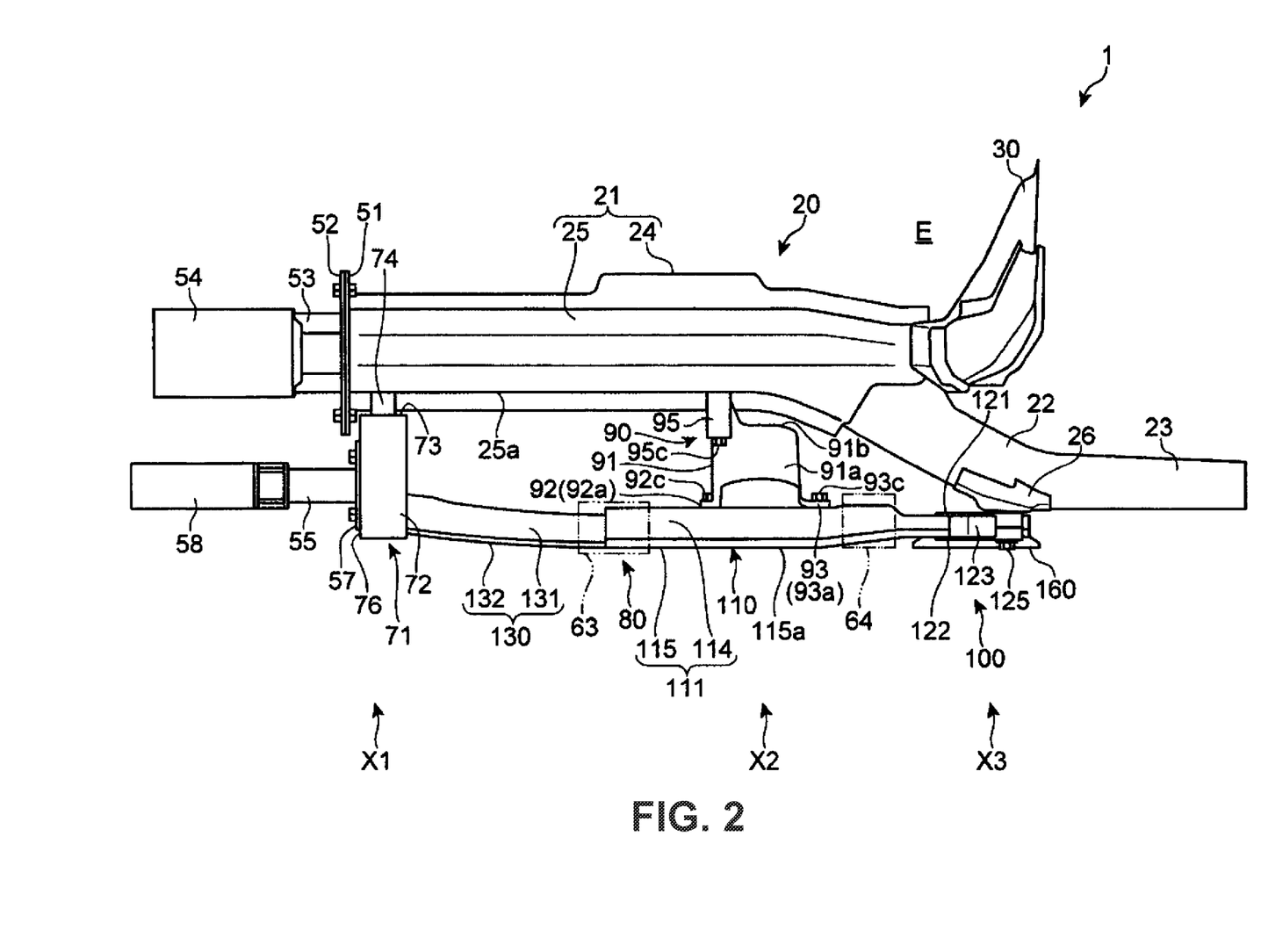
FIG. 2 is a side view of the front portion of the vehicle body including the suspension subframe structure according to the embodiment of the present invention.
Figure 3:
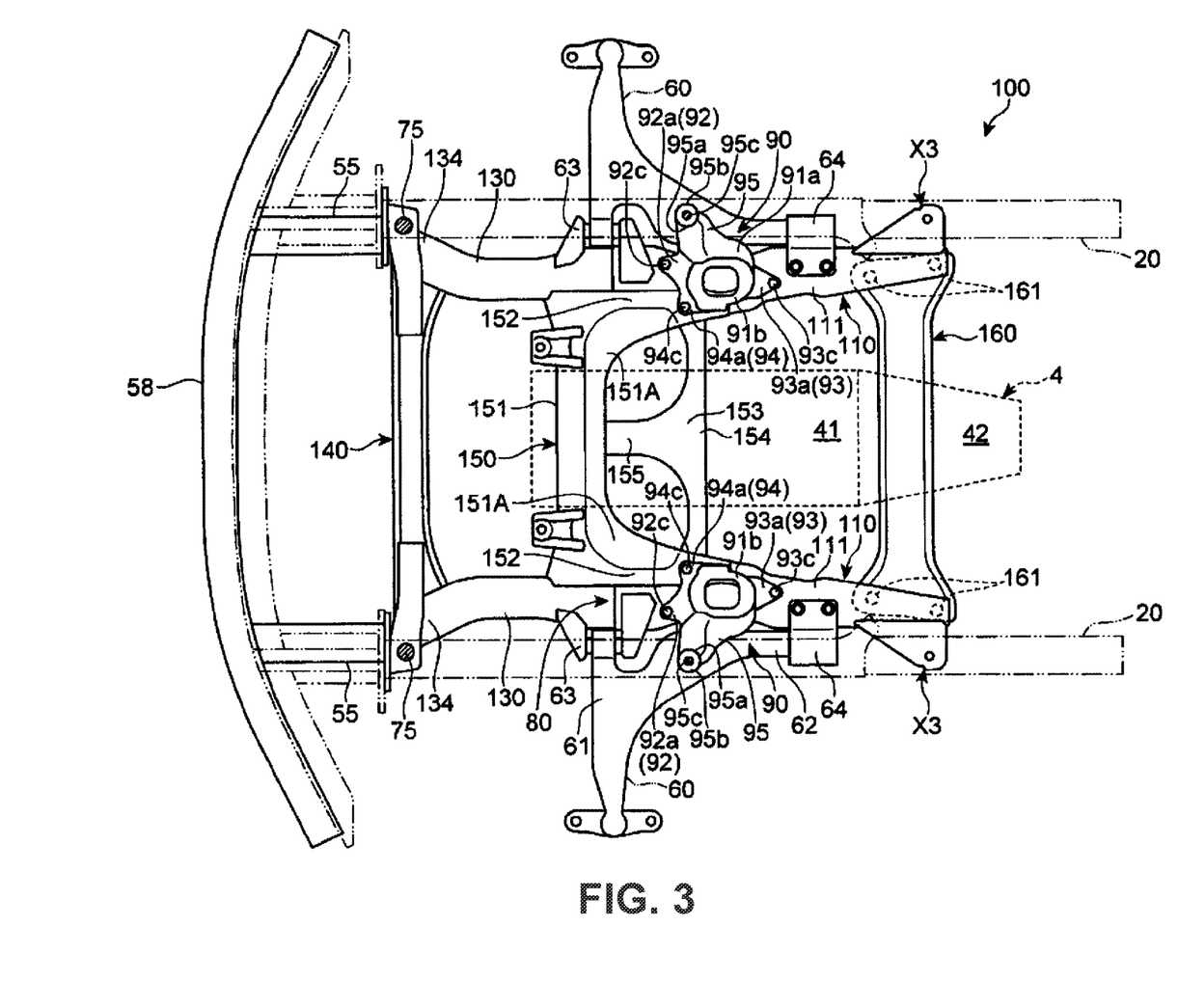
FIG. 3 is a plan view of the suspension subframe structure according to the embodiment of the present invention.

Referring to FIGS. 1 to 3, a description will be given of a front vehicle-body structure 1 including the suspension subframe structure of the present embodiment.

As shown in FIGS. 1 and 2, the front vehicle-body structure 1 includes a pair of right and left front side frames 20, 20 extending in a vehicle front-rear direction, a dash cross 30 disposed along a front face of a dash panel (not shown) and connecting the front side frames 20, 20, and a suspension subframe structure 100 disposed below the front side frames 20, 20.

The vehicle of the present embodiment uses a front-engine rear-wheel drive (FR) system.

A powertrain 4 including a longitudinally mounted engine 41 and a transmission 42 connected to a rear side of the engine 41 is disposed in an engine room E between the front side frames 20, 20 (see FIG. 3).

Each of the front side frames 20, 20 includes a front linear portion 21 extending frontward from the dash cross 30 substantially horizontally, an inclined portion 22 extending rearward from a rear end of the front linear portion 21 obliquely downwardly, and a rear linear portion 23 extending further rearward from a lower end of the inclined portion 22 substantially horizontally.

The front linear portion 21 of each of the front side frames 20, 20 is composed of an inner panel 24 positioned on a vehicle-width-direction inner side and an outer panel 25 positioned on a vehicle-width-direction outer side; these panels 24, 25 are joined to each other in the vehicle width direction. The inner panel 24 has a cross-section of a hat-shaped profile that opens toward the vehicle-width-direction outer side, and the outer panel 25 has a cross-section of a hat-shaped profile that opens toward the vehicle-width-direction inner side. These panels 24, 25 extend in the vehicle front-rear direction. The outer panel 25 and the inner panel 24 are joined to each other at their upper and lower edge portions. This gives the front linear portion 21 itself a closed cross-section that is continuous in the vehicle front-rear direction.

The inclined portion 22 of each of the front side frames 20, 20 has a cross-section of a hat-shaped profile that opens upward. The inclined portion 22 is disposed such that its rear portion is lowered along the shape of the dash panel 31, and an upper edge portion of the inclined portion 22 is joined to the dash panel 31. This results in a closed cross-section continuous in the vehicle front-rear direction being formed between the inclined portion 22 and the dash panel 31 (see FIG. 8).

The rear linear portions 23, 23 of the front side frames 20, 20 are connected at their rear ends to a front end of a floor frame (not shown) extended in the vehicle front-rear direction. A floor panel (not shown) is joined onto the rear linear portions 23, 23 and the floor frame, and a front end edge of the floor panel is connected to the dash panel. The rear linear portions 23, 23 and the floor frame each have a cross-section of a hat-shaped profile that opens upward, thus forming a closed cross-section continuous in the vehicle front-rear direction between the floor panel and each of the rear linear portions 23, 23 and the floor frame.

A main crash can 53 is connected to a front end of each of the front side frames 20, 20 via a set plate 51 and a mounting plate 52. The main crash can 53 is formed of a cylindrical body or the like that absorbs an impact load from the vehicle front side. A bumper reinforcement 54 extending in the vehicle width direction is attached to front ends of the pair of right and left main crash cans 53, 53.

Referring to FIG. 3 in addition to FIGS. 1 and 2, the above suspension subframe structure 100 will be described. The suspension subframe structure 100 includes: a pair of right and left suspension subframes 110, 110 that are disposed below the front side frames 20, 20 and respectively support lower arms 60, 60 as suspension members for front wheels; a pair of right and left extension frames 130, 130 that are joined to front ends of the respective suspension subframes 110, 110 and extend toward the vehicle front side; and first to third cross members 140, 150, 160 that each connect the right and left frames 110, 110, 130, 130.

Sub crash cans 55, 55 extend frontward from front ends of the respective extension frames 130, 130. A sub bumper reinforcement 58 extending in the vehicle width direction is provided in front of the sub crash cans 55, 55. The right and left sub crash cans 55, 55 are connected to each other via the sub bumper reinforcement 58.

Each of the lower arms 60, 60 supported by the respective suspension subframes 110, 110 includes a front arm portion 61 that extends substantially parallel to the vehicle width direction and a rear arm portion 62 that extends substantially horizontally from a vehicle-width-direction intermediate portion of the front arm portion 61 toward the vehicle-width-direction inner side and toward the rear side. The lower arm 60 is, as a whole, formed substantially in an L-shape in plan view.

The lower arm 60 is formed, in its inner portion in the vehicle width direction, with a front connecting portion 61a and a rear connecting portion 62a. The front connecting portion 61a is connected to a relatively front portion of the suspension subframe 110, and the rear connecting portion 62a is connected to a relatively rear portion of the suspension subframe 110. The front connecting portion 61a is provided at a vehicle-width-direction inner side end of the front arm portion 61, and the rear connecting portion 62a is provided at a rear end of the rear arm portion 62.

The front connecting portion 61a of the front arm portion 61 is supported by a front bracket 63 mounted across a front end of the suspension subframe 110 and a rear end of the extension frame 130 such that the front connecting portion 61a can pivot about an axis extending in the vehicle front-rear direction. The rear connecting portion 62a of the rear arm portion 62 is supported by a rear bracket 64 mounted on the suspension subframe 110 such that the rear connecting portion 62a can pivot about an axis extending in the vehicle front-rear direction.

Figure 4:
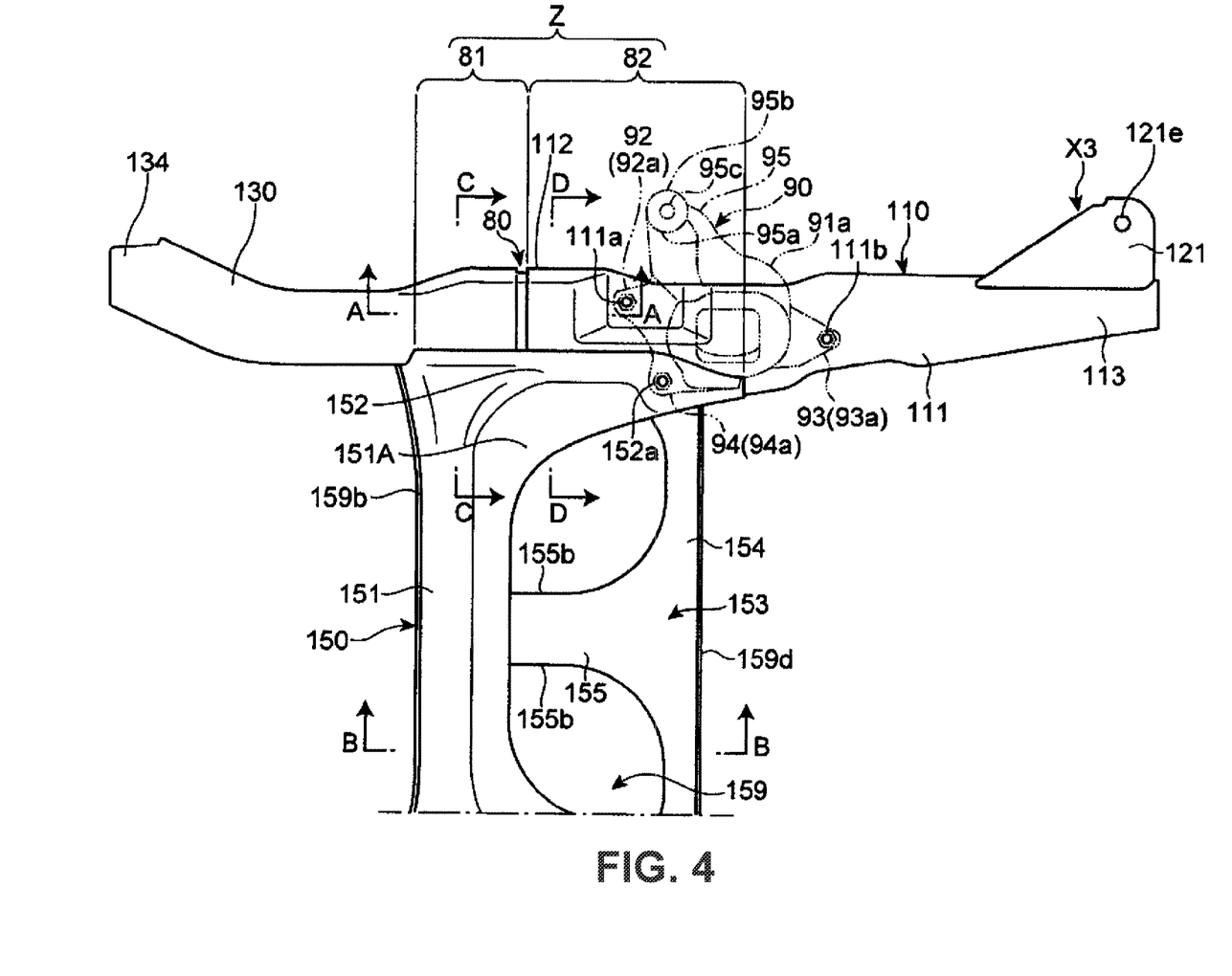
FIG. 4 is an enlarged view of a joined portion of the suspension subframe, an extension frame, and a second cross member in FIG. 3.
Figure 5:
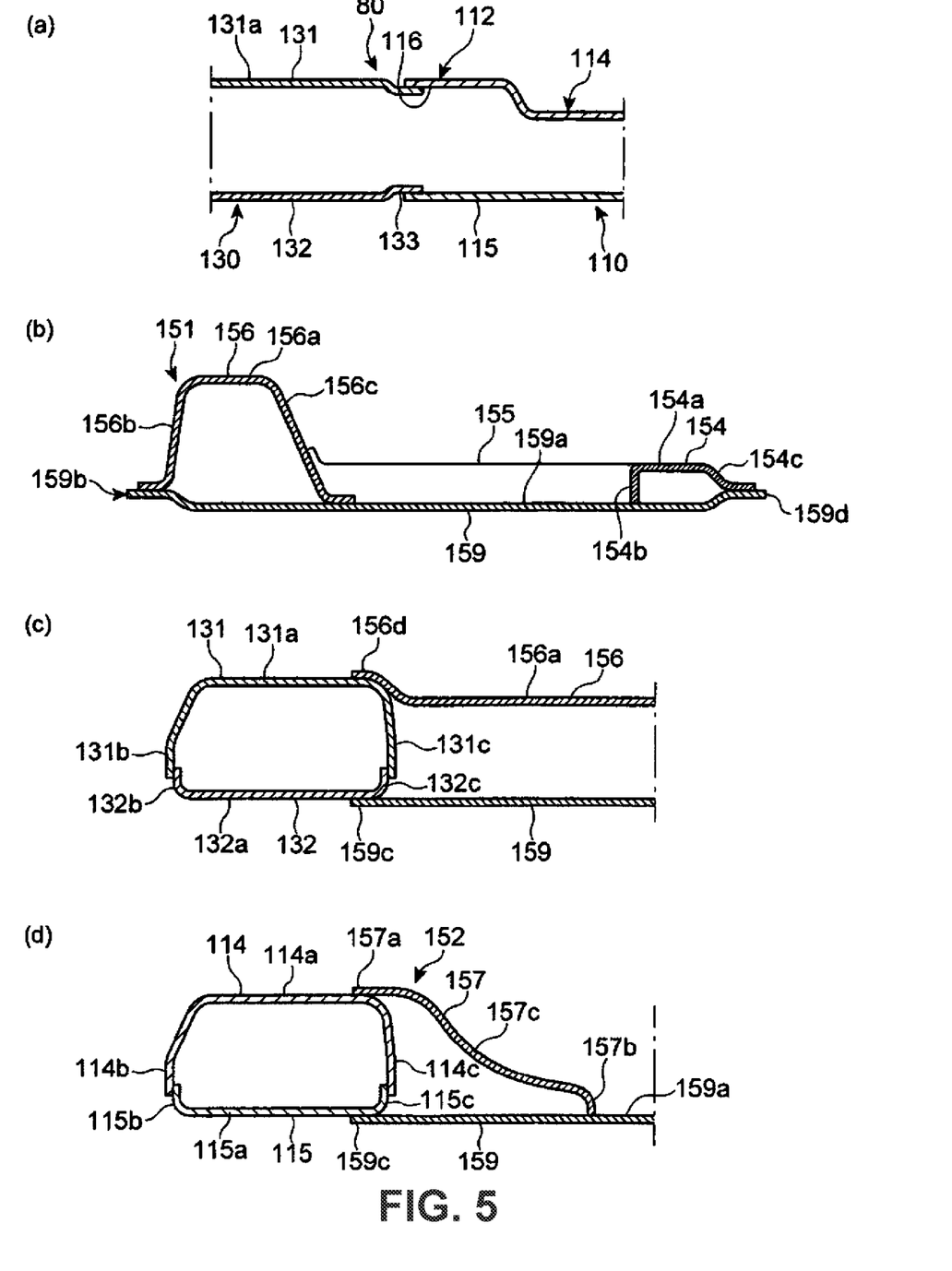
FIG. 5 includes (a) a sectional view taken along a line A-A, (b) a sectional view taken along a line B-B, (c) a sectional view taken along a line C-C, and (d) a sectional view taken along a line D-D in FIG. 4.

As shown in FIGS. 4 and 5, the suspension subframe 110 includes a body 111 supporting the lower arm 60. The rear end of the extension frame 130 is connected to a front end 112 of the body 111 of the suspension subframe 110. A rear end 113 of the body 111 is fixed to the front side frame 20 via a rear vehicle body mounting portion X3 (described later).

The body 111 of the suspension subframe 110 is an elongated portion disposed to extend in the vehicle front-rear direction. The body 111 is composed of an upper member 114 having a cross-section of a squared U-shape that opens downward and a lower member 115 having a cross-section of a squared U-shape that opens upward. A lower edge portion of the upper member 114 and an upper edge portion of the lower member 115 are joined to each other by, for example, welding. Between the upper member 114 and the lower member 115, the body 111 forms a closed cross-section continuous in the vehicle front-rear direction.

Specifically, the upper member 114 includes a top face 114a, and an outer side face 114b and an inner side face 114c in the vehicle width direction. The lower member 115 includes a bottom face 115a, and an outer side face 115b and an inner side face 115c in the vehicle width direction. The outer side faces 114b, 115b and the inner side faces 114c, 115c of the upper member 114 and the lower member 115 are respectively joined to each other, thereby forming a closed cross-section continuous in the vehicle front-rear direction (see FIG. 5(d)).

The front end 112 of the body 111 of the suspension subframe 110 is formed with an opening 116 (see FIG. 5(a)) that is delimited by the upper member 114 and the lower member 115.

As shown in FIGS. 5(a) and 5(c), similarly to the body 111 of the suspension subframe 110, the extension frame 130 is composed of an upper member 131 on the upper side and having a cross-section of a squared U-shape that opens downward and a lower member 132 on the lower side and having a cross-section of a squared U-shape that opens upward; this gives the extension frame 130 itself a closed cross-section that is continuous in the vehicle front-rear direction.

Specifically, the upper member 131 includes a top face 131a, and an outer side face 131b and an inner side face 131c in the vehicle width direction. The lower member 132 includes a bottom face 132a, and an outer side face 132b and an inner side face 132c in the vehicle width direction. The outer side faces 131b, 132b and the inner side faces 131c, 132c of the upper member 131 and the lower member 132 are respectively joined to each other, thereby forming a closed cross-section continuous in the vehicle front-rear direction (see FIG. 5(c)).

A rear end 133 of the extension frame 130 has a smaller outer diameter than that of a portion of the extension frame 130 located frontward of the rear end 133.

The frames 110, 130 are connected to each other by the rear end 133 of the extension frame 130 being inserted into the opening 116 (see FIG. 5(a)) of the front end 112 of the body 111 of the suspension subframe 110. The frames 110, 130 are joined to each other by, for example, welding at a connection portion 80 between the frames 110, 130. This makes the extension frame 130 and the suspension subframe 110 integrally continuous in the vehicle front-rear direction (see FIG. 5(a)).

In the present embodiment, the extension frame 130 is given a lower rigidity against an input load in the vehicle front-rear direction than that of the suspension subframe 110. This allows the extension frame 130 and the suspension subframe 110, which are continuous in the vehicle front-rear direction, to perform different functions. Specifically, this allows the suspension subframe 110, which is located on the rear side and has a relatively high rigidity, to serve as a load receiving portion and allows the extension frame 130, which is located on the front side and has a relatively low rigidity, to perform a load absorbing function.

Now a description will be given of the first to third cross members 140, 150, 160 disposed between the right and left suspension subframes 110, 110 and extension frames 130, 130 of the suspension subframe structure 100, with reference to FIG. 3.

The frame-like first cross member 140 is attached to front ends 134, 134 of the pair of right and left extension frames 130, 130. The first cross member 140 extends substantially linearly so as to connect the front ends 134, 134 of the extension frames 130, 130 in the vehicle width direction.

The connection portion 80 between the right suspension subframe 110 and the right extension frame 130 and a connection portion between the left suspension subframe 110 and the left extension frame 130 are connected to each other via the second cross member 150.

The second cross member 150 includes: a front side portion 151 that extends in the vehicle width direction between the right and left extension frames 130, 130 so as to connect these frames 130, 130; right and left side portions 152, 152 that extend toward the vehicle rear side respectively from right and left ends of the front side portion 151; and a reinforcement frame 153 that is disposed between the right and left side portions 152, 152. The reinforcement frame 153 includes a transverse frame portion 154 that extends in the vehicle width direction between rear ends of the right and left side portions 152, 152 so as to connect these rear ends and a longitudinal frame portion 155 that extends in the vehicle front-rear direction between the transverse frame portion 154 and the front side portion 151 so as to connect these portions 154, 151.

As shown in FIG. 5(b), the front side portion 151 is composed of a front side portion upper member 156 that extends in the vehicle width direction and has a cross-section of a squared U-shape opening downward and a plate-like lower member 159 that closes an open end of the front side portion upper member 156. The lower member 159 has a wider width in the vehicle front-rear direction than that of the front side portion upper member 156 and protrudes rearward relative to the front side portion upper member 156. The lower member 159 is disposed over a region in the vehicle front-rear direction that spans the extension frame 130 and the suspension subframe 110.

The front side portion upper member 156 includes a top face 156a, a front face 156b, and a rear face 156c. The front side portion upper member 156 is disposed on a top face 159a of the lower member 159 with the front face 156b disposed along a front end 159b of the lower member 159. Lower ends of the front face 156b and the rear face 156c are joined to the top face of the lower member 159, thereby forming a closed cross-section continuous in the vehicle width direction between the front side portion upper member 156 and the lower member 159.

As shown in FIG. 5(c), the top face 156a of the front side portion upper member 156 is joined, at its respective edge portions 156d, 156d in the vehicle width direction, to the top faces 131a, 131a of the extension frames 130, 130.

As shown in FIGS. 5(c) and 5(d), respective ends 159c, 159c of the lower member 159 in the vehicle width direction are joined to the bottom faces 132a, 132a of the extension frames 130, 130 and the bottom faces 115a, 115a of the bodies 111, 111 of the suspension subframes 110, 110.

As shown in FIG. 5(d), the right and left side portions 152, 152 are composed of the aforementioned lower member 159 and respective right and left side upper members 157, 157 that are integral and continuous with the aforementioned front side portion upper member 156. The right and left side upper members 157, 157 are disposed to extend in the vehicle front-rear direction and are continuous with the front side portion upper member 156 at their front ends. Thus, the front side portion upper member 156 and the right and left side upper members 157, 157 as a whole form a U-shape in plan view that opens toward the vehicle rear side (see FIG. 3).

An inner edge portion 157b of each of the right and left side upper members 157, 157 is located lower than its outer edge portion 157a in the vehicle width direction. Each of the right and left side upper members 157, 157 includes an inclined portion 157c that gradually lowers as it goes from the outer edge portion 157a to the inner edge portion 157b.

The inner edge portions 157b, 157b of the respective right and left side upper members 157, 157 are joined to the top face 159a of the lower member 159, and the outer edge portions 157a, 157a are respectively joined to the top faces 114a, 114a of the bodies 111, 111 of the suspension subframes 110, 110.

Thus, a closed cross-section continuous in the vehicle front-rear direction is formed by each of the right and left side upper members 157, 157, the lower member 159, and the inner side faces 114c, 115c of each of the bodies 111, 111 of the suspension subframes 110, 110.

As shown in FIG. 3, each of the right and left side portions 152, 152 of the second cross member 150 has a width that gradually increases toward the vehicle front side in plan view. Thus, reinforcement portions 151A, 151A having an arc contour are formed at respective corners between the front side portion 151 and the right and left side portions 152, 152. This increases the rigidity of the lower arm 60 of the suspension device against a lateral force, restraining deformation of the suspension subframe 110 and the extension frame 130 toward the vehicle-width-direction inner side.

As described above, the second cross member 150 includes the substantially T-shaped reinforcement frame 153, which is formed by the transverse frame portion 154 connecting the rear ends of the right and left side portions 152, 152 of the second cross member 150 and the longitudinal frame portion 155 connecting intermediate portions of the transverse frame portion 154 and the front side portion 151.

As shown in FIG. 5(b), the transverse frame portion 154 has a cross-section of a squared U-shape that extends in the vehicle width direction and opens downward. Meanwhile, the longitudinal frame portion 155 has a cross-section of a squared U-shape that extends in the vehicle front-rear direction and opens downward.

The transverse frame portion 154 includes a top face 154a, a front face 154b on the vehicle front side, and a rear face 154c on the vehicle rear side. The rear face 154c is disposed along a rear end 159d of the lower member 159. The front face 154b and the rear face 154c of the transverse frame portion 154 are joined to the top face of the lower member 159. This results in a closed cross-section that is continuous in the vehicle width direction between the transverse frame portion 154 and the lower member 159. Side portions 154d, 154e of the transverse frame portion 154 are respectively joined to the inclined portions 157c, 157c of the right and left side portions 152, 152 (see FIGS. 3 and 4).

The longitudinal frame portion 155 includes a top face 155a, and side faces 155b, 155b in the vehicle width direction. Lower ends of the side faces 155b, 155b in the vehicle width direction are joined to the lower member 159. This results in a closed cross-section that is continuous in the vehicle front-rear direction between the longitudinal frame portion 155 and the lower member 159. A front end 155c of the longitudinal frame portion 155 is joined to the rear face 156c of the front side portion 151.

Now a detailed description will be given of a joining area Z of the second cross member 150 at which the second cross member 150 is joined to the extension frame 130 and the suspension subframe 110, with reference to FIG. 4.

As described above, the outer edge portions 156d, 156d of the front side portion upper member 156 and the outer edge portions 157a, 157a of the right and left side upper members 157, 157 of the second cross member 150 are respectively joined to the top faces 131a, 131a of the rear ends 133, 133 of the extension frames 130, 130 and the top faces 114a, 114a of the front ends 112, 112 of the suspension subframes 110, 110.

The ends 159c, 159c of the lower member 159 are joined to the bottom faces 132a, 132a of the rear ends 133, 133 of the extension frames 130, 130 and the bottom faces 115a, 115a of the front ends 112, 112 of the suspension subframes 110, 110.

This results in the second cross member 150 being joined to the extension frame 130 and the suspension subframe 110 such that the second cross member 150 lies across the connection portion 80 between the extension frame 130 and the suspension subframe 110 and holds the frames 130, 110 from the vehicle-width-direction inner side. This restrains breakage, in the up-down direction and toward the vehicle-width-direction inner side in particular, of the connection portion 80 between the frames 110, 130.

Figure 6:
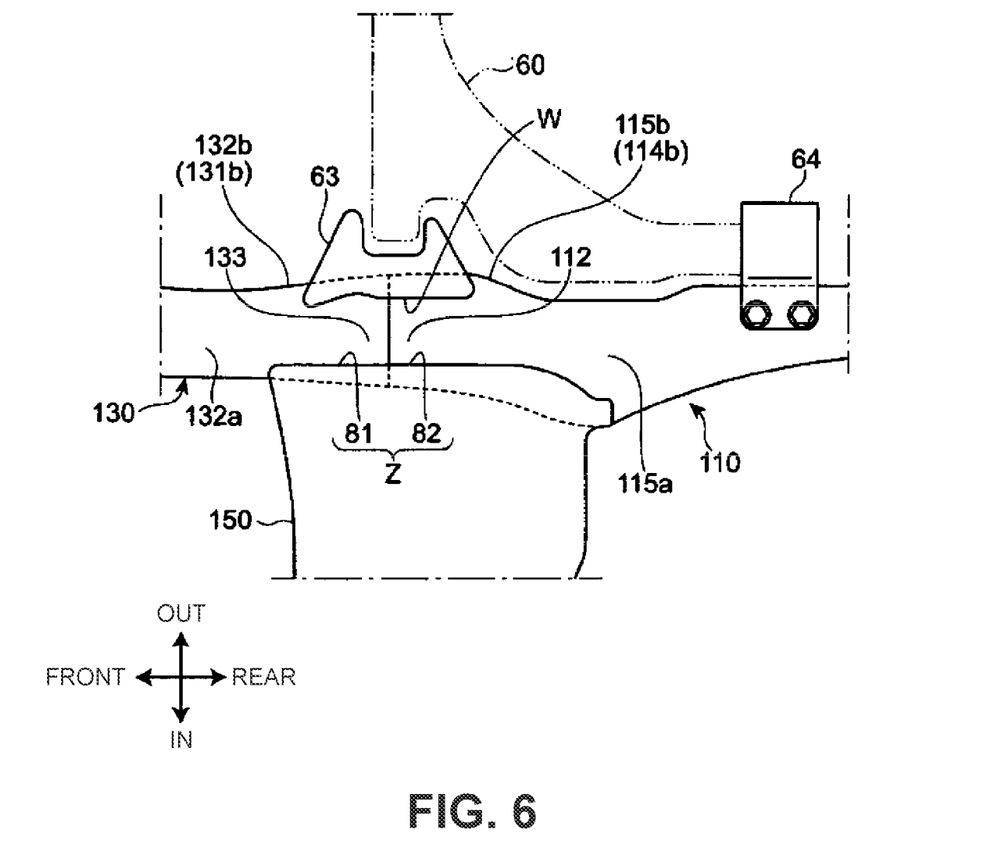
FIG. 6 is an enlarged bottom view of major parts of a joined portion of the suspension subframe, the extension frame, the second cross member, and a front bracket.

Also, as shown in the bottom view of FIG. 6, the lower arm 60 of the suspension device is supported via the front bracket 63 by portions on the outer side faces 132b, 131b sides in the vehicle width direction of the rear end 133 of the extension frame 130 and portions on the outer side faces 114b, 115b sides in the vehicle width direction of the front end 112 of the suspension subframe 110, as described above. The front bracket 63 is joined to the bottom faces of the frames 110, 130 at a portion denoted by W so as to be continuous with these bottom faces. In other words, the front bracket 63 is joined to a portion of the bottom face 132a of the extension frame 130 near the outer side faces 132b, 131b in the vehicle width direction of the rear end 133 and joined to a portion of the bottom face 115a of the suspension subframe 110 near the outer side faces 114b, 115b in the vehicle width direction of the front end 112.

Thus, the connection portion 80 between the extension frame 130 and the suspension subframe 110 is reinforced, on its vehicle-width-direction inner side, by the corresponding one of the right and left side portions 152, 152 of the second cross member 150 and is reinforced, on its vehicle-width-direction outer side, by the front bracket 63. This more effectively restrains breakage deformation of the connection portion 80 between the frames 130, 110. Note that reinforcement of the vehicle-width-direction outer side of the connection portion 80 between the frames 130, 110 is achieved by the front bracket 63, without the need for any additional component.

As shown in FIG. 4, a vehicle-width-direction outer side end of the second cross member 150 is joined to the extension frame 130 and the suspension subframe 110 so as to extend across the frames 130, 110. That is, a joining area Z of the second cross member 150 at which the second cross member 150 is joined to the extension frame 130 and the suspension subframe 110 includes an extension frame-side joining area 81 at which the second cross member 150 is joined to the extension frame 130 and a suspension subframe-side joining area 82 at which the second cross member 150 is joined to the suspension subframe 110.

At the joining area Z, a vehicle front-rear direction dimension of the extension frame-side joining area 81 is shorter than that of the suspension subframe-side joining area 82.

As such, the extension frame-side joining area 81 is made not longer than needed, which prevents the second cross member 150 from inhibiting deformation of the extension frame 130 in response to input of an impact load from the vehicle front side. This enables the extension frame 130 to exercise a good shock absorbing function.

Meanwhile, making the suspension subframe-side joining area 82 relatively long helps increase the strength and rigidity of the suspension subframe 110 against a load in the vehicle front-rear direction. This enables the suspension subframes 110, 110 to exercise a good function as a load receiving portion in response to input of an impact load from the vehicle front side, which in turn enables the extension frames 130, 130 to exercise a good shock absorbing function.

As shown in FIG. 3, the third cross member 160 is connected to the rear ends 113, 113 of the suspension subframes 110, 110 so as to connect the rear ends 113, 113 in the vehicle width direction. The third cross member 160 is a plate member extending in the vehicle width direction and fixed to the rear ends 113, 113 of the suspension subframes 110, 110 from below with multiple bolts 161 . . . 161 or the like.

Additionally, as shown in FIG. 2, the above suspension subframe structure 100 is provided, on its right and left sides, with three sets of front vehicle body mounting portions X1, X1, intermediate vehicle body mounting portions X2, X2, and rear vehicle body mounting portions X3, X3 as mounting portions for the front side frames 20, 20. Below a description will be given of each mounting portion.

Each front vehicle body mounting portion X1 is composed of a connection member 71 mounted on the front end 134 of the extension frame 130. Specifically, the connection member 71 is connected at its lower portion 72 to the extension frame 130 and is formed of a tower shape rising upward from this connecting portion.

Additionally, the connection member 71 is formed of a hollow box shape, and its top face 73 on the vehicle-width-direction outer side is mounted on the bottom face 25a of the outer panel 25 of the front side frame 20 via a mount bush 74. The connection member 71 is mounted on the bottom face 25a of the outer panel 25 with a fastening member 75 (see FIG. 3).

The sub crash can 55 is connected to an upright wall-like front face 76 of the connection member 71 via a mounting plate 57.

The intermediate vehicle body mounting portion X2 is composed of a powertrain mount bracket (hereinafter, also simply referred to as a "mount bracket") 90. The mount bracket 90 accommodates an engine mount (not shown) for elastically supporting the powertrain 4 (see FIG. 3). The mount bracket 90 is fixed to the body 111 of the suspension subframe 110. In the present embodiment, the mount bracket 90 is integrally formed by casting such as aluminum die casting. However, materials for the mount bracket 90 are not limited to aluminum.

The mount bracket 90 is provided with a hollow accommodation portion 91 including an accommodation space that opens upward. The accommodation portion 91 is of a cylindrical shape, for example. The accommodation portion 91 accommodates a mount support structure (not shown) connected to a powertrain-side bracket provided on the powertrain 4 side.

The mount bracket 90 is provided with multiple fastening portions 92, 93, 94 for fastening to the suspension subframe structure 100. The multiple fastening portions 92, 93, 94 consist of a front fastening portion 92 provided at a front edge portion of the mount bracket 90, a rear fastening portion 93 provided at a rear edge portion of the mount bracket 90, and an intermediate fastening portion 94 provided between the front fastening portion 92 and the rear fastening portion 93 in the vehicle front-rear direction.

Specifically, these fastening portions 92, 93, 94 are respectively composed of multiple flange portions 92a, 93a, 94a that extend outward from a lower end of an outer peripheral portion 91a of the accommodation portion 91 of the mount bracket 90. These flange portions 92a, 93a, 94a are formed with bolt insertion holes (not shown), and the mount bracket 90 is fastened to the suspension subframe structure 100 with bolts inserted into these bolt insertion holes.

Meanwhile, the suspension subframe 110 is formed with bolt fastening holes 111a, 111b (see FIG. 4) for mounting the mount bracket 90 that are located at positions corresponding to the above bolt insertion holes of the front fastening portion 92 and the rear fastening portion 93 of the mount bracket 90, respectively.

Each of the right and left side portions 152, 152 of the second cross member 150 is formed with a bolt fastening hole 152a for mounting the mount bracket 90 that is located at a position corresponding to the bolt insertion hole of the intermediate fastening portion 94. At the substantially same position as the transverse frame portion 154 in the vehicle front-rear direction, the intermediate fastening portion 94 is fastened to a portion of the corresponding side portion 152 near the rear end thereof. This restrains displacement of the mount bracket 90 that causes it to fall toward vehicle-width-direction inner side (so-called inward falling).

The bolts 92c, 93c, 94c (see FIG. 3) inserted into the bolt insertion holes of the mount bracket 90, the bolt fastening holes 111a, 111b of the suspension subframe 110, and the bolt fastening hole 152a of the right and left side portions 152 (see FIG. 4) are screwed into weld nuts (not shown) provided on the bottom face 115a of the suspension subframe 110 and the bottom face 159 of the side portion 152. The mount bracket 90 is thus fastened to the suspension subframe 110.

The mount bracket 90 is formed with a protruding portion 95 that extends upward toward the vehicle-width-direction outer side from a vehicle-width-direction outer edge of an upper wall portion 91b of the accommodation portion 91. The protruding portion 95 is provided, at its outer end 95a in the vehicle width direction, with a pillar portion 95b that projects upward. The pillar portion 95b is mounted on the bottom face 25a of the outer panel 25 with a bolt 95c at a rear portion of the front linear portion 21 of the front side frame 20, thus forming the intermediate vehicle body mounting portion X2. The intermediate vehicle body mounting portion X2 is rigidly joined to the front side frame 20 without any intervening damping element, such as a rubber bush.

Figure 7:
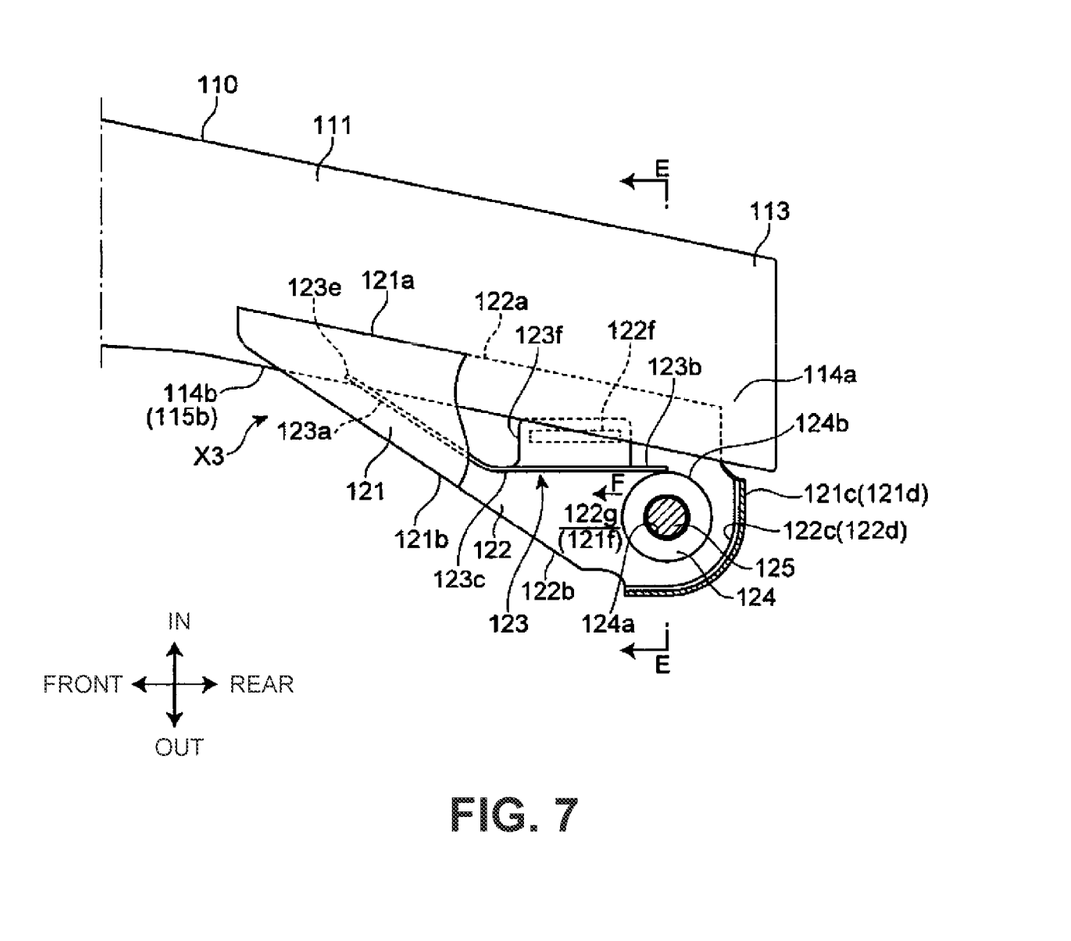
FIG. 7 is an enlarged, partially broken plan view of a mounting portion of the suspension subframe and its nearby portions in FIG. 3.
Figure 8:
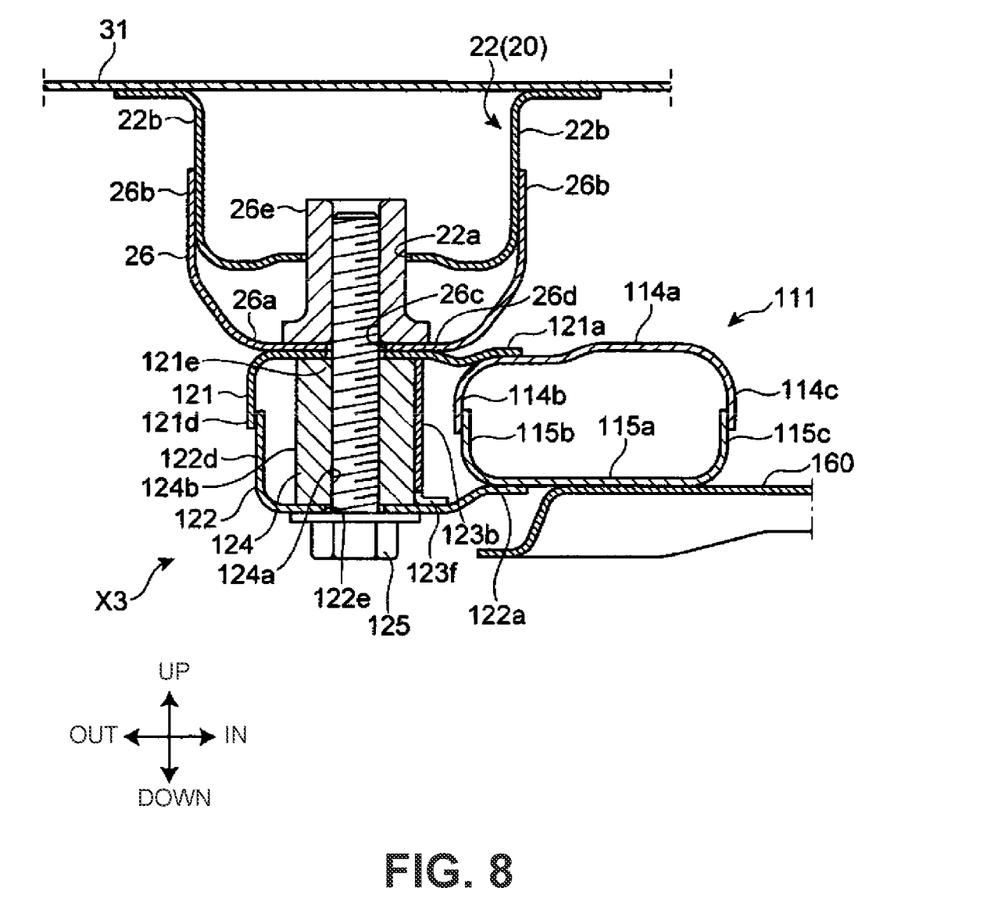
FIG. 8 is a sectional view taken along a line E-E in FIG. 7.

As shown in FIGS. 7 and 8, the rear vehicle body mounting portion X3 is provided at a lateral side in the vehicle width direction of the rear end 113 of the body 111 of the suspension subframe 110.

The rear vehicle body mounting portion X3 includes an upper plate member 121 as an upper connection portion disposed on the upper side, a lower plate member 122 as a lower connection portion disposed on the lower side, and a reinforcement member 123 disposed between the upper plate member 121 and the lower plate member 122.

The upper plate member 121 and the lower plate member 122 are disposed substantially perpendicularly to the vehicle up-down direction and in parallel with each other. The upper plate member 121 and the lower plate member 122 respectively include: side edge portions 121a, 122a extending parallel to the outer side faces 114b, 115b in the vehicle width direction of the suspension subframe 110; front edge portions 121b, 122b extending obliquely such that their rear portions protrude more outwardly in the vehicle width direction; and rear edge portions 121c, 122c connecting respective rear ends of the side edge portions 121a, 122a and respective rear ends of the front edge portions 121b, 122b. The upper plate member 121 and the lower plate member 122 as a whole are of a substantially triangular shape in plan view.

The rear edge portion 121c of the upper plate member 121 is provided with an upper joined portion 121d that extends from the rear edge portion 121c to the vehicle lower side. The rear edge portion 122c of the lower plate member 122 is provided with a lower joined portion 122d that extends from the rear edge portion 122c toward the vehicle upper side. The upper joined portion 121d and the lower joined portion 122d are overlapped and welded to each other, whereby the upper plate member 121 and the lower plate member 122 are joined together.

The side edge portion 121a of the upper plate member 121 and the side edge portion 122a of the lower plate member 122 are respectively joined to the top face 114a and the bottom face 115a at the rear portion of the body 111 of the suspension subframe 110. Thus, the rear vehicle body mounting portion X3 is joined to the body 111 of the suspension subframe 110.

The upper plate member 121 and the lower plate member 122 of the rear vehicle body mounting portion X3 are respectively provided with bolt insertion holes 121e, 122e for fastening the suspension subframe 110 to the front side frame 20. The bolt insertion holes 121e, 122e are spaced to the vehicle-width-direction outer side from the body 111 of the suspension subframe 110.

The reinforcement member 123 connects the upper plate member 121 and the lower plate member 122. The reinforcement member 123 includes a front portion 123a extending parallel to the front edge portions 121b, 122b of the upper and lower plate members 121, 122 in plan view and a rear portion 123b extending from a rear end of the front portion 123a to the vehicle rear side. The reinforcement member 123 generally has a V-shape in plan view comprised of the front portion 123a and the rear portion 123b. As shown in FIGS. 7 and 8, the rear portion 123b of the reinforcement member 123 is provided between the body 111 of the suspension subframe 110 and the bolt insertion holes 121e, 122e of the upper and lower plate members 121, 122.

An upper end 123c and a lower end 123d of the reinforcement member 123 are respectively joined to the upper plate member 121 and the lower plate member 122, and the front end 123e is joined to the side faces 114b, 115b of the body 111 of the suspension subframe 110.

The lower end of the rear portion 123b of the reinforcement member 123 is provided with a tongue piece portion 123f that extends from the lower end toward the vehicle-width-direction inner side, and the rear portion 123b is joined at the tongue piece portion 123f to the top face of the lower plate member 122. The lower plate member 122 is provided with a work opening 122f (see FIG. 7) at its position corresponding to the tongue piece portion 123f, and the work opening 122f allows the tongue piece portion 123f to be passed therethrough and joined to the lower plate member 122 from below.

A sleeve member 124 as a spacer is disposed between the upper plate member 121 and the lower plate member 122 at a position corresponding to the bolt insertion holes 121e, 122e of these plate members 121, 122. The sleeve member 124 is a fixed position fixed to the front side frame 20 with a bolt 125.

The sleeve member 124 is disposed near a lateral side of the body 111 such that an axis of the sleeve member 124 is perpendicular to the upper plate member 121 and the lower plate member 122. A hole 124a of the sleeve member 124 is aligned with the bolt insertion hole 121e of the upper plate member 121 and the bolt insertion hole 122e of the lower plate member 122. A rear edge portion of the rear portion 123b of the above-described reinforcement member is joined to an outer peripheral surface 124b of the sleeve member 124 by, for example, welding. Thus, the sleeve member 124 is positioned with respect to the upper plate member 121 and the lower plate member 122 via the reinforcement member 123.

Meanwhile, as shown in FIG. 8, a bracket 26 for fixing the rear vehicle body mounting portion X3 is joined to a rear end of the inclined portion 22 of the front side frame 20. The bracket 26 has a cross-section of a squared U-shape that opens upward, and includes a bottom face 26a and side faces 26b, 26b.

The bracket 26 is located below the front side frame 20, and the side faces 26b, 26b of the bracket 26 are joined to the respective side faces 22b, 22b in the vehicle width direction of the inclined portion 22 of the front side frame 20.

The bottom face 26a of the bracket 26 is provided with a bolt hole 26c at a position corresponding to the bolt insertion holes 121e, 122e of the rear vehicle body mounting portion X3, and a pipe-shaped weld nut 26e is joined to a top side 26d of the bottom face 26a.

At the rear vehicle body mounting portion X3, a bolt 125 is inserted from below into the bolt insertion hole 122e of the lower plate member 122, the hole 124a of the sleeve member 124, the bolt insertion hole 121e of the upper plate member 121, and a bolt hole 26c of the bracket 26, and thus a distal end of the bolt 125 is screwed into the weld nut 26e, whereby the suspension subframe 110 is fastened and fixed to the underside of the front side frame 20.

As a result of this fastening, the sleeve member 124 is fixed at its upper end face to the upper plate member 121 and fixed at its lower end face to the lower plate member 122. Hence, the sleeve member 124 is connected to the body 111 via the upper plate member and the lower plate member 122.

A hole 22a is provided in an underside of the rear end of the inclined portion 22 of the front side frame 20 at a position corresponding to the above weld nut 26e. Inserting a distal end of the weld nut 26e into the hole 22a prevents the bolt 125 from falling.

Now a description will be given of a behavior of the suspension subframe structure 100 according to the present embodiment in response to input of an impact load from the front side of the vehicle body including the suspension subframe structure 100.

An impact load input to the bumper reinforcement 54 from the vehicle front side is transmitted to the vehicle rear side via the main crash cans 53, 53 and the front side frames 20, 20.

Also, an impact load input to the sub bumper reinforcement 58 from the vehicle front side is transmitted to the front side frames 20, 20 via the sub crash cans 55, 55, the extension frames 130, 130, the bodies 111, 111 of the suspension subframes 110, 110, and the rear vehicle body mounting portions X3, X3.

As such, in the present embodiment, the load can be distributed over the two load paths to be transmitted to the vehicle rear side.

Also, when a relatively large impact load is input to the bumper reinforcement 54 and the sub bumper reinforcement 58 from the vehicle front side, the main crash cans 53, 53 and the sub crash cans 55, 55 crush to absorb the impact. A residual impact load that has not been absorbed by the crush deformation of the crash cans 53, 53, 55, 55 is input to the front ends of the front side frames 20, 20 and the extension frames 130, 130 and transmitted to the vehicle rear side through the above two load paths.

When a larger impact load is input from the vehicle front side, the front side frames 20, 20 and the extension frames 130, 130 deform to absorb the impact load. At this time, the suspension subframes 110, 110 effectively function as the load receiving portion by virtue of the closed cross-section structure described above, which enhances the shock absorbing function of the extension frames 130, 130.

At this time, in the intermediate vehicle body mounting portions X2, X2, the bolts 95c, 95c are displaced in the vehicle up-down direction due to deformation of the front side frames 20, 20 and the extension frames 130, 130, which allows the suspension subframes 110, 110 to disengage from the front side frames 20, 20 relatively easily.

Since the intermediate vehicle body mounting portions X2, X2 are rigidly joined without any intervening damping element, such as a rubber bush, the impact load from the vehicle front side is input to the connection portions without being absorbed by a rubber bush and the like. In the present embodiment, the mount bracket 90 constituting each of the intermediate vehicle body mounting portions X2, X2 is made of aluminum and thus has a relatively low strength, so that the mount bracket 90 is easily broken under the impact load from the vehicle front side. This allows the suspension subframes 110, 110 to disengage from the front side frames 20, 20 relatively easily.

In the front vehicle body mounting portions X1, X1, the front side frames 20, 20 are connected to the extension frames 130, 130 each via the mount bush 74, and thus their connection is not easy to release as compared to the intermediate vehicle body mounting portions X2, X2. Nonetheless, as the extension frames 130, 130 have the load absorbing function unlike the suspension subframes 110, 110, the extension frames 130, 130 do not hinder the deformation of the front side frames 20, 20.

Additionally, when a large impact load (impact load greater than or equal to a predetermined load) that cannot be absorbed by the deformation of the extension frames 130, 130 is input to the suspension subframes 110, 110, the suspension subframes 110, 110, which are the high-rigidity portions, do not deform greatly and can start retracting together with the powertrain 4.

At this time, in the rear vehicle body mounting portions X3, X3, the upper plate members 121, 121 and the lower plate members 122, 122 of the suspension subframes 110, 110 are to retract together with the bodies 111, 111.

Meanwhile, the lower ends of the inclined portions 22, 22 of the front side frames 20, 20 mounted with the rear vehicle body mounting portions X3, X3 are configured to experience less deformation, for they constitute vehicle body portions near the front end of the vehicle cabin. Hence, the bolts 125, 125 used for fastening of the rear vehicle body mounting portions X3, X3 are made hard to drop. This facilitates keeping the sleeve members 124, 124 fixed to the front side frames 20, 20 with the bolts 125, 125.

Thus, when the impact load is input to the body 111 of the suspension subframe 110 from the vehicle front side via the extension frame 130, the sleeve member 124 and the bolt 125 are to be displaced toward the vehicle front side, as shown by the arrow F in FIG. 7, relative to the upper plate member 121 and the lower plate member 122 retracting together with the body 111.

Here, in the suspension subframe 110, the upper plate member 121 and the lower plate member 122, via which the sleeve member 124 is connected to the body 111, have a lower strength against a load in the vehicle front-rear direction than that of the body 111 and the sleeve member 124.

In particular, as shown in FIG. 7, portions of the upper plate member 121 and the lower plate member 122 in the vehicle width direction that are located closer to the sleeve member 124 relative to the reinforcement member 123 are not reinforced by the reinforcement member 123, thus defining fragile portions 121f, 122g with a lower strength.

Additionally, in the fragile portions 121f, 122g of the upper plate member 121 and the lower plate member 122, the bolt insertion holes 121e, 122e having the bolt 125 inserted therethrough can function as breakage facilitating portions that facilitate breakage of the upper plate member 121 and the lower plate member 122 by the bolt 125, as shown in FIG. 8.

Hence, when the sleeve member 124 and the bolt 125 are to be displaced toward the vehicle front side relative to the upper plate member 121 and the lower plate member 122 as described above (see the arrow F in FIG. 7), interference of the bolt 125 with front edges of the bolt insertion holes 121e, 122e of the fragile portions 121f, 122g brings about breakage of the upper plate member 121 and the lower plate member 122 that permits such relative displacement. This facilitates breakage such that the bolt 125 breaks into portions of the fragile portions 121f, 122g that are located frontward of the bolt insertion holes 121e, 122e.

As the suspension subframe 110 breaks in the fragile portions 121f, 122g between the body 111 and the sleeve member 124 in this manner, the rear vehicle body fastening portion X3 of the suspension subframe 110 essentially disengages from the front side frame 20.

This allows the extension frames 130, 130 and suspension subframes 110, 110, which do not have the function of absorbing the impact load any more, to disengage from the vehicle body. This in turn effectively restrains deformation of the inside of the vehicle cabin that might otherwise be caused by retraction of the suspension subframes 110, 110.

Since each of the reinforcement members 123, 123 is located between the corresponding one of the bodies 111, 111 of the suspension subframes 110, 110 and the corresponding one of the sleeve members 124, 124, interference between the sleeve members 124, 124 and the reinforcement members 123, 123 can be readily avoided when the bolts 125, 125 and the sleeve members 124, 124 are displaced relatively toward the vehicle front side.

While the suspension subframe structure including the extension frames has been described in the above embodiment, the present invention is applicable to a suspension subframe structure that does not include extension frames.

INDUSTRIAL APPLICABILITY

As described above, the present invention can activate the load paths using the extension frames in an impact while avoiding increase in vehicle weight and also enables the suspension subframes to disengage from the vehicle body when an impact load is too large to be absorbed by the extension frames alone; as such, the present invention may be suitably used in the field of vehicle body manufacturing.

REFERENCE SIGNS LIST 60, 60 Lower arm (suspension member)
100 Suspension subframe structure
110, 110 Suspension subframe
111, 111 Body
121, 121 Upper plate member (connection portion)
122, 122 Lower plate member (connection portion)
121f, 121f, 122g, 122g Fragile portion
123, 123 Reinforcement member
124, 124 Sleeve member (fixed portion)
125, 125 Bolt
121e, 122e, 121e, 122e Bolt insertion hole (breakage facilitating portion)
130, 130 Extension frame

The invention claimed is:

1. A suspension subframe structure comprising:
a suspension subframe that supports a suspension member for a front wheel, characterized in that the suspension subframe includes: a body that transmits an impact load input from a vehicle front side toward a vehicle rear side; a fixed portion disposed near the body and fixed to a vehicle body; and a connection portion connecting the fixed portion to the body,
the connection portion comprises an upper plate member and a lower plate member,
a reinforcement member is mounted at a portion of the connection portion located between the fixed portion and the body, the reinforcement member connects the upper plate member and the lower plate member in a vehicle up-down direction,
the connection portion is provided with a fragile portion having a lower strength against a load in a vehicle front-rear direction than the body and the fixed portion,
the upper plate member and the lower plate member of the connection portion have a lower strength against a load in the vehicle front-rear direction than that of the body and the fixed portion,
a portion of the upper plate member and the lower plate member of the connection portion in a vehicle width direction that is located closer to the fixed portion relative to the reinforcement member and in a frontward of the fixed portion is not reinforced by the reinforcement member in order to form the fragile portion with a lower strength against a load in the vehicle front-rear direction than other portions in the connection portion, and
the reinforcement member and the fragile portion are provided at a same level in the vehicle up-down direction.

2. The suspension subframe structure according to claim 1, characterized in that an extension frame extending from a front end of the body toward the vehicle front side is connected with the suspension subframe.

3. The suspension subframe structure according to claim 2, characterized in that a reinforcement member is mounted at a portion of the connection portion located between the fixed portion and the body, and
the fragile portion is provided at a portion of the connection portion located closer to the fixed portion relative to the reinforcement member.

4. The suspension subframe structure according to claim 3, characterized in that the fragile portion is provided with a breakage facilitating portion that facilitates breakage to allow the fixed portion to be displaced toward the vehicle front side relative to the body when a load is input to the body from the vehicle front side.

5. The suspension subframe structure according to claim 2, characterized in that the fragile portion is provided with a breakage facilitating portion that facilitates breakage to allow the fixed portion to be displaced toward the vehicle front side relative to the body when a load is input to the body from the vehicle front side.

6. The suspension subframe structure according to claim 2, characterized in that the fixed portion is disposed laterally to the body.

7. The suspension subframe structure according to claim 6, characterized in that the body has a closed cross-section continuous in the vehicle front-rear direction,
the fixed portion is a sleeve member into which a bolt for fastening to the vehicle body is inserted, and
the connection portion is a plate member joined to an end face of the sleeve member with the bolt.

8. The suspension subframe structure according to claim 7, characterized in that a reinforcement member is mounted at a portion of the connection portion located between the fixed portion and the body, and
the fragile portion is provided at a portion of the connection portion located closer to the fixed portion relative to the reinforcement member.

9. The suspension subframe structure according to claim 8, characterized in that the fragile portion is provided with a breakage facilitating portion that facilitates breakage to allow the fixed portion to be displaced toward the vehicle front side relative to the body when a load is input to the body from the vehicle front side.

10. The suspension subframe structure according to claim 1, characterized in that the fixed portion is disposed laterally to the body.

11. The suspension subframe structure according to claim 10, characterized in that the fragile portion is provided with a breakage facilitating portion that facilitates breakage to allow the fixed portion to be displaced toward the vehicle front side relative to the body when a load is input to the body from the vehicle front side.

12. The suspension subframe structure according to claim 1, characterized in that the body has a closed cross-section continuous in the vehicle front-rear direction,
the fixed portion is a sleeve member into which a bolt for fastening to the vehicle body is inserted, and
the connection portion is a plate member joined to an end face of the sleeve member with the bolt.

13. The suspension subframe structure according to claim 12, characterized in that the fragile portion is provided with a breakage facilitating portion that facilitates breakage to allow the fixed portion to be displaced toward the vehicle front side relative to the body when a load is input to the body from the vehicle front side.

14. The suspension subframe structure according to claim 1, characterized in that a reinforcement member is mounted at a portion of the connection portion located between the fixed portion and the body, and
the fragile portion is provided at a portion of the connection portion located closer to the fixed portion relative to the reinforcement member.

15. The suspension subframe structure according to claim 14, characterized in that the fragile portion is provided with a breakage facilitating portion that facilitates breakage to allow the fixed portion to be displaced toward the vehicle front side relative to the body when a load is input to the body from the vehicle front side.

16. The suspension subframe structure according to claim 1, characterized in that the fragile portion is provided with a breakage facilitating portion that facilitates breakage to allow the fixed portion to be displaced toward the vehicle front side relative to the body when a load is input to the body from the vehicle front side.

17. The suspension subframe structure according to claim 1, characterized in that the reinforcement member and the fragile portion are provided adjacent to each other.

18. The suspension subframe structure according to claim 1, characterized in that the reinforcement member is a plate-shaped member extending in the vehicle front-rear direction and in the vehicle up-down direction.

19. The suspension subframe structure according to claim 1, characterized in that the reinforcement member includes a front portion and a rear portion extending from a rear end of the front portion to the vehicle rear side and has a V-shape in a plan view comprised of the front portion and the rear portion so that a front end of the front portion is provided near to the body.

20. A suspension subframe structure comprising:
a suspension subframe that supports a suspension member for a front wheel, characterized in that the suspension subframe includes: a body that transmits an impact load input from a vehicle front side toward a vehicle rear side; a fixed portion disposed near the body and fixed to a vehicle body; and a connection portion connecting the fixed portion to the body, wherein the connection portion is provided with a fragile portion having a lower strength against a load in a vehicle front-rear direction than the body and the fixed portion; and
a reinforcement member is mounted with the connection portion, and the reinforcement member includes a front portion and a rear portion extending from a rear end of the front portion to the vehicle rear side and has a V-shape in a plan view comprised of the front portion and the rear portion so that a front end of the front portion is provided near to the body.

* * * * *